United States Patent
Butters et al.

[11] 3,816,649
[45] June 11, 1974

[54] OPTICAL INSPECTION

[75] Inventors: John Neil Butters, Woodthrope; Jack Albert Leendertz, Loughborough, both of England

[73] Assignee: National Research Development Corporation, London, England

[22] Filed: June 19, 1972

[21] Appl. No.: 264,007

[30] Foreign Application Priority Data
June 22, 1971 Great Britain.................... 29213/71

[52] U.S. Cl.................................. 178/6.8, 350/3.5
[51] Int. Cl. ............................................ H04n 7/18
[58] Field of Search.............. 178/6.8, 7.1, DIG. 27, 178/DIG. 3, DIG. 33; 350/3.5

[56] References Cited
UNITED STATES PATENTS
3,649,754   3/1972   Macouski............................ 178/6.8

*Primary Examiner*—Howard W. Britton
*Attorney, Agent, or Firm*—Cushman, Darby & Cushman

[57] ABSTRACT

An inspection system employing television techniques makes use of coherent optical phenomena. A comparison is made between two video signals each resulting from irradiation of a photosensitive screen with coherent light consisting of two interfering beams, the light of one beam having been scattered from a surface to be inspected and imaged on the screen. In studying deformation of a surface, the two signals are derived with the surface in different states. In comparing two similar surfaces, the two signals may be derived using light of different wavelengths, the two interfering beams consisting of light scattered respectively from the two surfaces.

27 Claims, 4 Drawing Figures

PATENTED JUN 11 1974 3,816,649

OPTICAL INSPECTION

This invention is concerned with the application of television techniques to optical inspection systems, and seeks to provide methods and apparatus having a variety of possible uses in the field of engineering metrology. The invention makes use of the coherent optical phenomenon known as "speckle effect"; as has been shown by Leendertz (journal of Physics E: Scientific Instruments, 1970, Vol. 3, pages 214–218), this phenomenon can be used as the basis of a method of coding three-dimensional data on to a two-dimensional interface.

In taking advantage of this possibility the invention provides a method of optical inspection, comprising correlating two similar video signals respectively representing the point-by-point variations of intensity in two patterns of illumination, each of which results from the irradiation of a photo-sensitive screen with coherent light consisting of two interfering beams one of which is constituted by light scattered from a surface to be inspected and imaged on to the photo-sensitive screen.

It is to be understood that in this specification the term light includes ultra-violet and infra-red radiation as well as visible radiation.

The types of information which may be obtained by using a method in accordance with the invention will be discussed in more detail below. It may generally be noted here, however, that since the information is dependent on a comparison of point-by-point variations of intensity it is necessary, if efficient use is to be made of the available illumination, to arrange that the spatial frequencies at all points in each pattern of illumination lie wholly or mainly within a range which can be resolved by the arrangement used for deriving the relevant video signal from the photo-sensitive screen on which the pattern of illumination is formed. The range of spatial frequencies in the "speckle pattern" that would result from irradiation of the screen with only the beam of light scattered from the surface to be inspected will of course depend on the aperture of the optical system used for imaging this light on to the screen, and the aperture should be made sufficiently small to restrict this range of spatial frequencies appropriately. Assuming this condition to be satisfied, it is also necessary to ensure that the second of the two interfering beams has a form such that the interference between the two beams will not result in a material extension of the range of spatial frequencies in the overall pattern of illumination beyond that pertaining to the speckle pattern referred to above; this additional requirement will be met if the form of the second beam is such that at any point in the pattern of illumination the maximum angle between a ray of the first beam and a ray of the second beam is not greater than the maximum angle between rays of the first beam. This will be achieved automatically if the second beam also consists of scattered light imaged on to the photo-sensitive screen and (as will normally be desirable) the same optical system is used for imaging the light of both beams. In some cases, however, it may be preferred that the second beam should have a smooth wavefront, and the angular condition specified above should then be taken into account in choosing the position and shape of this beam; the optimum arrangement in this respect is for the second beam to diverge from an effective point source disposed at a position optically equivalent to the centre of the aperture of the optical system used for imaging the light of the first beam.

One application of a method in accordance with the invention is the study of the deformation of the surface of an object under stress. In this case the two patterns of illumination are arranged to be formed successively in the same manner on the same photo-sensitive screen respectively before and after a change in the state of the object; the correlation between the two video signals may be effected either between recorded versions of the two signals or between a recorded version of the first signal to be derived and the second signal as derived. The second beam is made the same for both patterns of illumination and may either be constituted by light scattered from a different surface and imaged on to the photo-sensitive screen, or may have a smooth wavefront.

Another application of a method in accordance with the invention is the comparison of two nominally identical surfaces. In this case each pattern of illumination may be formed by two beams of light respectively scattered from the two surfaces and imaged, preferably in the same manner, on to a photo-sensitive screen, the two patterns of illumination being respectively formed under conditions which differ in respect of the optical (but not the geometrical) path lengths between the photo-sensitive screen and the two surfaces but are otherwise identical. This may readily be effected by arranging for the two patterns of illumination to be formed respectively by means of light of different wavelengths, in which case the two patterns of illumination may respectively be formed simultaneously on two different photo-sensitive screens by means of which the two video signals are respectively derived; the correlation between these signals may then be effected as they are derived. Alternatively, the two patterns of illumination may be formed successively on the same photo-sensitive screen, the correlation being effected between one video signal as derived and a delayed version of the other video signal.

In all the cases discussed above the result of the correlation may conveniently itself be displayed as a television picture whose brightness will vary from point to point, in accordance with the differences between the two patterns of illumination. Alternative methods of handling the data resulting from the correlation, for example using conventional digital techniques, can of course readily be envisaged.

The or each photo-sensitive screen will normally be embodied in an electron tube of a conventional type, and it may be noted for example that a standard 625 line vidicon camera tube is suitable for a wide range of possible applications of the invention; such a tube may suitably be used in conjunction with an imaging system having an aperture of $f/11$. With maximum resolution televison equipment, it is envisaged that it should be possible to use apertures of up to at least $f/5.6$ while achieving a reasonable degree of efficiency in respect of the data resolution.

A method in accordance with the invention may be compared favourably with the techniques of holographic interferometry to which considerable attention has been devoted in recent times. Thus the method avoids the inconvenience associated with the need to make photographic recordings, and lends itself readily to the comparison of surfaces with a sensitivity appropriate to typical engineering requirements, which is much lower than the sensitivity of conventional techniques of holographic interferometry. It is also relevant to note that the spatial frequencies normally involved in holography are not sufficiently low to be readily handled by means of television equipment of existing types.

The invention also provides various forms of apparatus for use in the methods discussed above, and will be more fully described and explained with reference to the accompanying drawings, in which.

Figure 1:
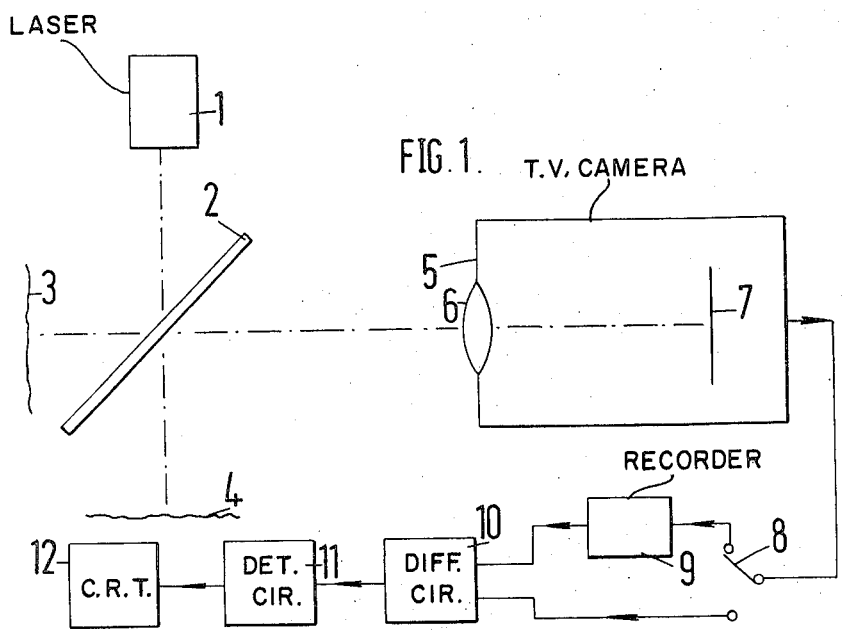
FIG. 1 is a diagram illustrating an apparatus for use in investigating the deformation of a surface of an object under stress.

Referring to FIG. 1, the apparatus includes a laser source 1, from which is derived a beam of coherent light that is arranged to fall on a semi-reflecting mirror 2. The light reflected by the mirror 2 illuminates a surface 3 which is to be investigated, while the light transmitted by the mirror 2 illuminates a surface 4 of the same general form as the surface 3, the surfaces 3 and 4 being disposed symmetrically with respect to the mirror 2. The surfaces 3 and 4 are arranged to be viewed simultaneously by a television camera 5, the camera 5 being focussed so that light scattered from the surfaces 3 and 4 and respectively transmitted and reflected by the mirror 2 is imaged by means of an optical system 6 (diagrammatically represented as a single lens) incorporated in the camera 5 on to the photo-senstive screen 7 of an electron tube incorporated in the camera 5. This tube may be either a conventional camera tube, or may be an image intensifier tube disposed in front of a conventional camera tube, the latter alternative being adopted where the illumination level would be two low for satisfactory operation of a conventional camera tube; where an image intensifier tube is used, it is readily possible to arrange for pulsed operation of this tube to give an effect equivalent to stroboscopic illumination, thereby permitting the study of cyclic and transient events.

The camera 5 operates in entirely conventional fashion to provide a video signal representing the point-by-point variations of intensity in the illumination of the screen 7. It will be appreciated that this illumination is the resultant of two independent speckle patterns respectively derived from the surfaces 3 and 4, and is itself in the form of a speckle pattern. It will be appreciated that the aperture of the imaging optical system 6 is chosen sufficiently small to ensure that the speckle pattern can be substantially resolved by the camera 5; it is primarily because of the need to use a relatively small aperture that provision may need to be made to cater for a low illumination level at the photo-sensitive screen 7.

The apparatus functions by comparing the resultant of the speckle patterns derived from the surfaces 3 and 4 before the relevant deformation of the surface 3 with the corresponding resultant after this deformation, the surface 4 remaining unchanged. With the surface 3 in its initial state, the video signal derived from the camera 5 is fed via a switch 8 to a recording device 9, which may suitably employ either a magnetic disc or tape system or a storage cathode ray tube, the device 9 operating to record the video signal over a single complete scan of the photo-sensitive screen 7. To study the surface 3 in a deformed state, the switch 8 is operated to feed the video signal from the camera 5 to one input of a differencing circuit 10, and the device 9 is operated in the playback mode so as to feed the recorded video signal repeatedly to the other input of the circuit 10 in synchronism with the scanning of the camera 5. The output of the circuit 10, which represents the point-by-point variations in the difference between the two resultant speckle patterns, is an alternating signal whose strength varies in accordance with the displacements at different points of the surface 3 from the original position, the strength of the signal being zero at instants corresponding to points of the surface 3 where the displacement is zero or is such as to give rise to an optical phase change equal to a multiple of $2\pi$ radians; a phase change of $2s\pi$ radians corresponds to a normal displacement at the surface 3 of one half the wavelengths of the illuminating light.

The signal derived from the circuit 10 is fed to a detector circuit 11, which preferably incorporates a full-wave rectifier, to provide a unidirectional signal representing the point-by-point variations in displacement, and this signal is fed to a cathode ray tube monitor 12, which is scanned in synchronism with the camera 5, to provide a picture representative of the deformation of the surface 3. It will be appreciated that this picture will exhibit dark lines representing loci of constant normal displacement on the surface 3.

It will be appreciated that with this system changes in deformation can be studied continuously as they occur. It should be noted, however, that stringent precautions are likely to be needed to ensure accurate synchronisation between the operation of the camera 5 and that of the recording device 9. In a modified system (not illustrated) such a requirement can be avoided, at the expense of the facility to study changes as they occur, by arranging to record both of the video signals respectively corresponding to the states of the surface 3 before and after a deformation, the recordings being made in a similar manner for the two signals and these signals being played back synchronously to enable the correlation to be effected.

Figure 2:
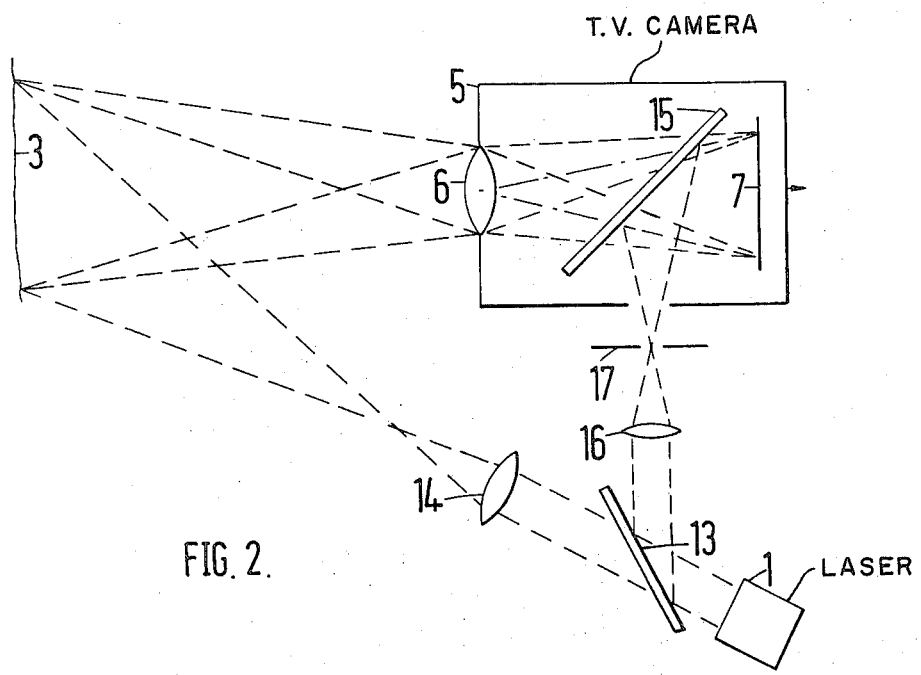
FIG. 2 is a diagram illustrating a modification of the arrangement of FIG. 1.

In the arrangement described above the illumination of the screen 7 in each state of the surface 3 is the resultant of two speckle patterns. In an alternative arrangement this illumination may consist of the resultant of a speckle pattern derived from the surface 3 and irradiation by a beam having a smooth wavefront. FIG. 2 illustrates such an arrangement, in which the beam from the laser source 1 is split by a semi-reflecting mirror 13, the transmitted light being formed by means of a lens 14 into a divergent beam which illuminates the surface 3. The surface 3 is viewed as before by a television camera 5 incorporating an optical imaging system 6 and a photo-sensitive screen 7, but in this case there is disposed between the system 6 and the screen 7 a semi-reflecting mirror 15 which transmits light scattered from the surface 3 and imaged by the system 6 and which reflects on to the screen 7 a divergent beam formed by a lens 16 from the light reflected by the mirror 13. Preferably the mirror 15 is in the form of a wedge of small angle having an anti-reflection coating on the face nearer the system 6. The lens 16 is disposed so that the position of the effective point source of the divergent beam, at which a pinhole spatial filter 17 is preferably provided, is optically equivalent to the centre of the aperture of the imaging system 6. This arrangement has a geometry such that at any point on the screen 7 the angles between the relevant ray of the divergent beam and the relevant rays of the beam of scattered light imaged by the system 6 will necessarily be smaller than the maximum angle between the rays of this beam of scattered light. The interference between the two beams will therefore not increase the range of spatial frequencies in the pattern of illumination on the screen 7 beyond that pertaining to the speckle pattern derived from the surface 3.

The remainder of the apparatus consists of components similar to the components 8 to 12 described above with reference to FIG. 1, and the apparatus operates in a manner similar to that described above with reference to FIG. 1 so that the monitor 12 provides a display representative of the deformation of the surface 3.

Figure 3:
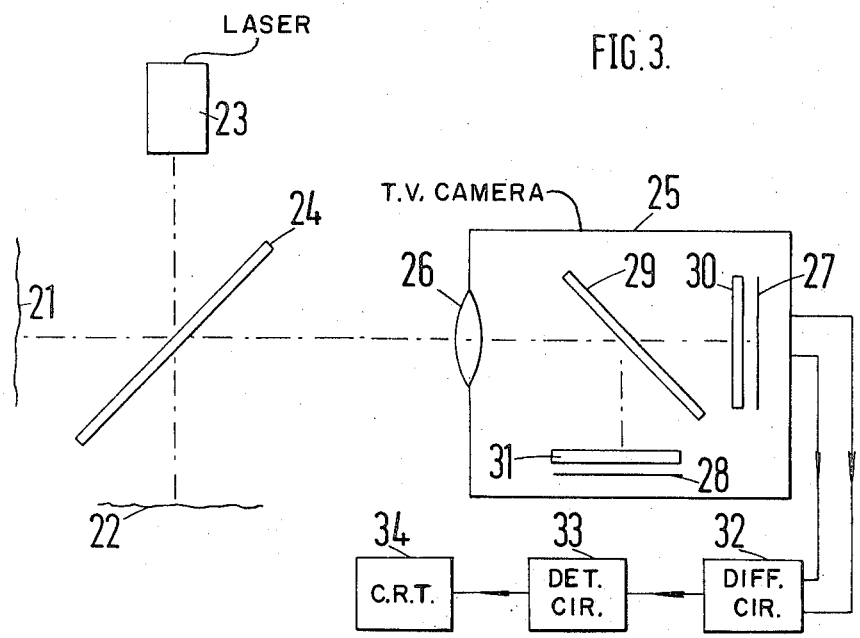
FIG. 3 is a diagram illustrating an apparatus for use in comparing two nominally identical surfaces.

In addition to its use in investigating the deformation of a single surface, the invention may be applied to the comparison of two separate surfaces of nominally identical form. Normally one of these surfaces will be a "master" surface against which the other surface is to be checked. FIG. 3 illustrates an arrangement suitable for use in this application of the invention, in which the two surfaces 21 and 22 to be compared are arranged to be illuminated in a similar manner to the surfaces 3 and 4 in FIG. 1, by means of a laser source 23 and a semi-reflecting mirror 24. In this case, however, the source 23 is chosen to give substantial outputs at two different light wavelengths $\lambda_1$ and $\lambda_2$, and may for example comprise an argon laser arranged to give substantial outputs at wavelengths of 4,965A and 4,880A. As before, there is provided a television camera 25 arranged so as to view the surfaces 21 and 22 simultaneously in a similar manner, and incorporating an optical imaging system 26; in this case, however, the camera 25 incorporates two similar electron tubes having photo-sensitive screens 27 and 28 disposed so as to receive light which has been respectively transmitted and reflected by a semi-reflecting mirror 29, the screens 27 and 28 being disposed in optically equivalent positions with respect to the system 26 and respectively having disposed in front of them intefere ce filters 30 and 31 which respectively transmit light of the wavelengths $\lambda_1$ and $\lambda_2$. As a result, there are superimposed at the screen 27 two speckle patterns derived by virtue of light of wavelength $\lambda_1$ scattered respectively by the surfaces 21 and 22, and there are superimposed at the screen 28 two speckle patterns derived by virtue of light of wavelength $\lambda_2$ scattered respectively by the surfaces 21 and 22.

The camera 25 operates in conventional fashion to provide two video signals respectively representing the point-by-point variations of intensity in the illuminations of the screens 27 and 28, the scanning of the two screens being synchronised. It will be appreciated that precautions must be taken to ensure accurate registration of the scans and that provision should be made to enable the balance between the two video signals to be adjusted to cater for possible differences between the illumination levels at the wavelengths $\lambda_1$ and $\lambda_2$ and between the channels respectively incorporating the two electron tubes; these requirements are, however, no more severe than are encountered in conventional colour television cameras.

The two video signals derived from the camera 25 are respectively fed to the inputs of a differencing circuit 32, the output of which is of similar form to the output of the circuit 10 in FIG. 1, being an alternating signal whose strength varies in accordance with the discrepancies between the surfaces 21 and 22 at corresponding points of these surfaces. The strength of the signal is zero at instants corresponding to positions where the discrepancy is zero or is a multiple of $\lambda_1\lambda_2/2(\lambda_1 - \lambda_2)$; it may be noted that this quantity has a value of about 14 microns when the wavelengths $\lambda_1$ and $\lambda_2$ have the specific values quoted above in respect of an argon laser. The output of the circuit 32 is utilised in a similar manner to that of the circuit 10 in FIG. 1, being fed to a detector circuit 33 whose output is applied to a cathode ray tube monitor 34.

It will be appreciated that the arrangement just described makes possible the real time comparison of two surfaces with a controlled sensitivity (which is determined by choice of the wavelengths $\lambda_1$ and $\lambda_2$); such a facility is not feasible with currently available holographic techniques.

Figure 4:
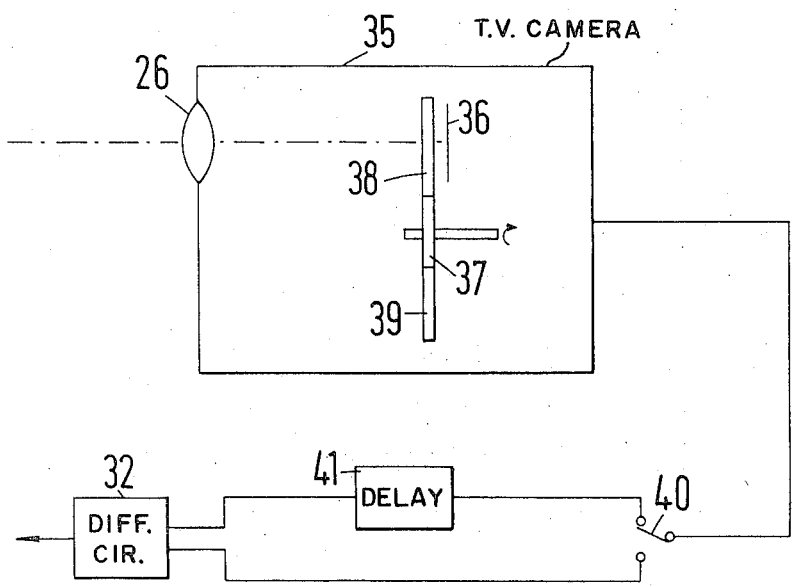
FIG. 4 is a diagram illustrating a modification of the arrangement of FIG. 3.

FIG. 4 illustrates a modification of the arrangement shown in FIG. 3, the components 21 to 24 being arranged as before and therefore being omitted from FIG. 4. In this modification the camera 25 is replaced by a camera 35 incorporating an optical imaging system 26 similar to that of the camera 25 and a single electron tube having a photo-sensitive screen 36 in front of which is disposed a wheel 37 carrying two filters 38 and 39 respectively similar to the filters 30 and 31, the wheel 37 being rotated in synchronism with the frame scanning of the camera 35 so that the screen 36 receives light of the wavelengths $\lambda_1$ and $\lambda_2$ during alternate frames. The video signal output from the camera 35 is fed to a switching device 40 arranged to operate in synchronism with the frame scanning, so that the video signals respectively derived from the camera 35 during alternate frames are respectively applied to one input of the circuit 32 and the input of a delay device 41 whose output is connected to the other input of the circuit 32, the delay device 41 operating to impose a delay of one frame period. The output from the circuit 32 is utilised in the same manner as before, the apparatus comprising components similar to the components 33 and 34 shown in FIG. 3.

With the two wavelength system for the comparison of two surfaces, the illumination conditions becomme more stringent as higher sensitivities are required. For the highest possible sensitivity it is necessary for the illumination and viewing directions for each surface to be equally inclined to, and in the same plane as, the normal to the surface at every point. In other words the illumination and viewing directions must be the same as if the surface were highly polished. For a complex surface this illumination situation may be achieved by means of a suitable hologram. Such a hologram may be made by taking a highly polished replica of the surface of interest and illuminating it with a point source situated at the usual viewing point relative to the surface. The light reflected from this replica interferes with a suitable beam in the plane of the hologram. When the hologram is illuminated with only the reference beam, reversed in direction, it will diffract light back along the original path, i.e., back towards the surface and then, by reflection, back to the point source. Thus a non-polished surface replacing the polished surface would be illuminated in the desired manner when viewed from the point source position.

Arrangements similar to those described above with reference to FIGS. 1 and 2 may also be used to provide a television picture in the form of a contour map of the surface 3 if the source 1 is replaced by a source capable of giving substantial outputs at two different light wavelengths. In this case the two video signals derived successively from the camera 5 are arranged respectively to represent patterns of illumination formed by light of the two wavelengths without any change in the surface 3, by appropriate filtering of the light reaching the screen 7. The picture displayed by the monitor 12 will then consist of dark lines on a light background, these lines being contours of constant displacement of points on the surface 3 from a notional surface having a form determined by the form of the illumination of the surface 3, and the contour interval being dependent on the difference between the two wavelengths. If the procedure is repeated with a different surface, it is then possible to make a comparison between the two surfaces by correlating the signals derived from the circuit 11 respectively for the two surfaces; it will of course be necessary to record at least one of these signals before the comparison is made.

The arrangements described above with reference to FIGS. 3 and 4 may also be modified to enable individual contour maps of the surfaces 21 and 22 to be obtained. A suitable modification would involve the provision of means for introducing into the camera 25 or 35 a divergent beam arranged similarly to that used in the arrangement described with reference to FIG. 2, this beam being derived from the source 23 and consisting of light of the two wavelengths $\lambda_1$ and $\lambda_2$, and the provision of shutters for selectively blanking off the surfaces 21 and 22. Here again a comparison between the surfaces 21 and 22 can be effected by correlating the signals derived from the circuit 33 respectively for the two surfaces.

We claim:
1. A method of optical inspection comprising:
   deriving two similar video signals respectively representing the point-by-point variations of intensity in two patterns of illumination each of which results from the irradiation of a photo-sensitive screen with coherent light consisting of first and second interfering beams,
   said first beam in each case being constituted by light scattered from a surface to be inspected and imaged on to the photo-sensitive screen and said second beam in each case having a form such that at every point in the relevant pattern of illumination the maximum angle between a ray of the first beam and a ray of the second beam is not greater than the maximum angle between rays of the first beam; and
   correlating said two video signals.
2. A method according to claim 1, in which said two patterns of illumination are simultaneously formed respectively by means of light of two different wavelengths and respectively on two different photo-sensitive screens by means of which said two video signals are respectively derived.
3. A method according to claim 1, in which the correlation comprises deriving a unidirectional signal whose magnitude varies in accordance with the strength of the alternating components of the difference between said two video signals.
4. A method according to claim 1, in which the result of the correlation is itself displayed as a television picture whose brightness varies from point to point in accordance with the differences between said two patterns of illumination.
5. A method according to claim 1, in which the imaging of the light is effected using an aperture not greater than $f/5.6$.
6. A method according to claim 1, applied to the comparison of two nominally identical surfaces, in which each pattern of illumination is formed by two beams of light respectively scattered from the two surfaces and imaged in a similar manner on to a photo-sensitive screen, the two patterns of illumination being respectively formed under conditions which differ in respect of the optical (but not the geometrical) path lengths between the photo-sensitive screen and the two surfaces but are otherwise identical.
7. A method according to claim 6, in which the said patterns of illumination are formed successively on the same photo-sensitive screen, the correlation being effected between the video signal as derived and a delayed version of the other video signal.
8. A method according to claim 6, in which said two patterns of illumination are formed respectively by means of light of two different wavelengths.
9. A method according to claim 8, in which said two patterns of illumination are respectively formed simultaneously on two different photo-sensitive screens by means of which two video signals are respectively derived.
10. A method according to claim 1, in which said two patterns of illumination are formed successively in the same manner on the same photo-sensitive screen, the correlation being effected using a recorded version of the first signal to be derived.
11. A method according to claim 10, in which said two patterns of illumination are formed respectively by means of light of two different wavelengths.
12. A method according to claim 10, in which said two patterns of illumination are formed using light of the same wavelength respectively before and after a change in the state of an object of which said surface forms part, said second beam being the same for both patterns of illumination.
13. A method according to claim 12, in which said second beam is constituted by light scattered from a different surface and imaged on to the photo-sensitive screen in the same manner as for said first beam.
14. A method according to claim 12, in which said second beam has a smooth wavefront such that the beam diverges from an effective point source disposed at a position optically equivalent to the centre of the optical system used for imaging the light of said first beam.
15. Apparatus for use in optical inspection, the apparatus comprising:
   a television camera operative to generate video signals representing the point-by-point variations of intensity in patterns of illumination formed on at least one photo-sensitive screen incorporated in the camera, the camera further incorporating an optical system for imaging on to said at least one screen light from surfaces viewed by the camera;

illuminating means operative when a surface is viewed by said camera to irradiate each photo-sensitive screen incorporated in said camera with coherent light consisting of two interfering beams a first of which is constituted by light scattered from said surface and imaged on to the screen by said optical system and the second of which has a form such that at every point in the pattern of illumination formed on the screen by said two interfering beams the maximum angle between a ray of the first beam and a ray of the second beam is not greater than the maximum angle between rays of the first beam; and means for correlating two video signals derived from said camera.

16. Apparatus according to claim 15, in which said illuminating means is operative so that said second beam has a smooth wavefront such that the beam diverges from an effective point source disposed at a position optically equivalent to the centre of the aperture of said optical system.

17. Apparatus according to claim 15, in which there are provided means enabling said camera to view two similar surfaces simultaneously in a similar manner, said illuminating means being operative to illuminate the two surfaces in a similar manner, whereby said two interfering beams will be constituted by light respectively scattered from the two surfaces.

18. Apparatus according to claim 15, in which the aperture of said optical system is not greater than $f/5.6$.

19. Apparatus according to claim 15, in which said illuminating means is operative at two different light wavelengths.

20. Apparatus according to claim 19, in which said television camera incorporates two photo-sensitive screens, and means rendering said screens respectively responsive to light of said two wavelengths.

21. Apparatus according to claim 15, in which said camera incorporates only a single photo-sensitive screen, and the correlating means is operative to correlate two video signals derived from said camera at different times.

22. Apparatus according to claim 21, in which said correlating means comprises means for recording the video signal which is derived at the earlier of said different times, and means for utilising the recorded version of that signal in effecting the correlation.

23. Apparatus according to claim 15, in which the correlating means comprises means for deriving a unidirectional signal whose magnitude varies in accordance with the strength of the alternating components of the difference between said two video signals.

24. Apparatus according to claim 23, comprising a cathode ray tube monitor operative in synchronism with said television camera, and means for applying said unidirectional signal to said monitor.

25. Apparatus for use in the optical comparison of two nominally identical surfaces, the apparatus comprising:

a television camera operative to generate two video signals respectively representing the point-by-point variations of intensity in two patterns of illumination formed respectively by light of two different wavelengths on at least one photo-sensitive screen incorporated in the camera, the camera further incorporating an optical system for imaging on to said at least one screen light from surfaces viewed by the camera;

means for enabling the camera to view two surfaces to be compared in a similar manner;

means for illuminating said two surfaces, while they are so viewed, in a similar manner with coherent light of said two different wavelengths; and means for correlating said two video signals.

26. Apparatus according to claim 25, in which said television camera is operative to generate said two video signals simultaneously, the camera incorporating two photo-sensitive screens by means of which said two video signals are respectively derived.

27. Apparatus according to claim 25, in which said television camera is operative to generate said two video signals alternately, and the correlating means is operative to effect the correlation between one video signal as derived and a delayed version of the other video signal.

* * * * *